United States Patent [19]

Thommen

[11] Patent Number: 4,506,206
[45] Date of Patent: Mar. 19, 1985

[54] METHOD OF AND CIRCUIT ARRANGEMENT FOR CONTROLLING THE TORQUE OF A STEPPING MOTOR

[75] Inventor: Werner F. Thommen, Staefa, Switzerland

[73] Assignee: U.S. Philips Corporation, New York, N.Y.

[21] Appl. No.: 456,680

[22] Filed: Jan. 10, 1983

[30] Foreign Application Priority Data

Jan. 21, 1982 [CH] Switzerland ............... 383/82

[51] Int. Cl.³ ........................................... H02K 29/04
[52] U.S. Cl. ....................................... 318/696; 318/685
[58] Field of Search ................... 318/696, 685, 430; 368/157

[56] References Cited

U.S. PATENT DOCUMENTS

| | | | |
|---|---|---|---|
| 4,192,131 | 3/1980 | Hosokawa et al. | 368/157 |
| 4,208,868 | 6/1980 | Regnier et al. | 368/62 |
| 4,340,946 | 7/1982 | Kanno et al. | 368/76 |
| 4,439,717 | 3/1984 | Berney | 318/696 |

Primary Examiner—William M. Shoop
Assistant Examiner—Saul M. Bergmann
Attorney, Agent, or Firm—Robert T. Mayer; Bernard Franzblau

[57] ABSTRACT

A stepping motor (M) with a self-inductance L is energized with pulses. If the motor current $i_m$ is less than a reference value $I_R = V_{ref}/R_o$, the motor is connected to the battery and if $i_m$ is greater than $I_R$ the motor is short-circuited. The motor current therefore fluctuates around the value $I_R$. The motor current is adjusted so that the average voltage during a first measuring interval, in the range of the maximum angular velocity, is twice that during a second measuring interval at the end of the energizing phase. The two average voltages are compared with each other by measuring the time during which the switch (S) is in the energizing position. In this way it is not necessary to measure the voltage induced in the self-inductance L and every motor pulse is checked constantly. The motor current is adjusted at the end of the energizing phase to provide a correct adaptation to the required motor torque. Tolerances of all the elements involved, including the motor, are automatically compensated.

14 Claims, 8 Drawing Figures $$I_{R1} = \frac{V_{ref1}}{R_0}$$

$$I_{R2} = \frac{V_{ref2}}{R_0} = \frac{V_{ref1}}{kR_0} = \frac{I_{R1}}{k}$$

METHOD OF AND CIRCUIT ARRANGEMENT FOR CONTROLLING THE TORQUE OF A STEPPING MOTOR

This invention relates to a method of controlling the torque of a stepping motor which is energized with pulses of variable duration, the motor current being measured and being maintained constant by controlling the duration of the energizing pulses. The invention also relates to a circuit arrangement for carrying out the method.

A special method of energizing a stepping motor is described in Communication No. 27 of the 56th Chronometry Congress on Oct. 23 and 24, 1981. In accordance with this method the motor behaviour during stepping can be determined by analyzing the voltage induced in the motor coil as a result of the motor motion. Currently such stepping motors are energized with constant-voltage pulses. In this way it is possible to determine the magnitude of the induced voltage by measuring the motor current by means of a resistor arranged in the power-supply line.

Since both the self-inductance and the internal resistance of the motor are variable, the induced voltage must be determined accurately.

In said publication it is therefore proposed to energize the motor with a constant current. As a result of this the voltage across the motor coil will vary. The self-inductance is then zero and the internal resistance constant. This means that the variation of the voltage across the motor coil is proportional to the induced voltage.

In order to put this theory into practice it is proposed to apply the motor current periodically to a current discriminator, for example with a frequency of 16 kHz. This is then effected for a few microseconds. The output signal of the discriminator indicates when the current through the motor is greater than a nominal current and the motor current is then switched off. If the current is smaller, energization is continued until the next measurement. If the current is larger the motor is short-circuited and during the next measurement energization is restored if the motor current has become smaller. In the other case the short-circuit is maintained.

Since the current in an inductance does not vary rapidly the current remains substantially equal to the nominal current during the short-circuit. This makes it possible to measure this current by means of an external resistor and to adapt the current so as to obtain the required torque.

It is an object of the invention to provide a method by means of which each motor pulse can be checked without the provision of a special measuring interval during the short-circuit. Moreover, the method should enable the motor current to be measured during driving.

To this end the invention is characterized in that information about the actual value of the motor current is obtained by determining the induced voltage during a plurality of measuring intervals, from which information a criterion for controlling the motor current is derived.

A circuit arrangement for carrying out the method is characterized in that for determining the induced voltage the current is measured by means of the impedance of at least one switching stage which connects the motor to the voltage source.

The invention will now be described in more detail, by way of example, with reference to the drawing. In the drawing.

Figure 4:
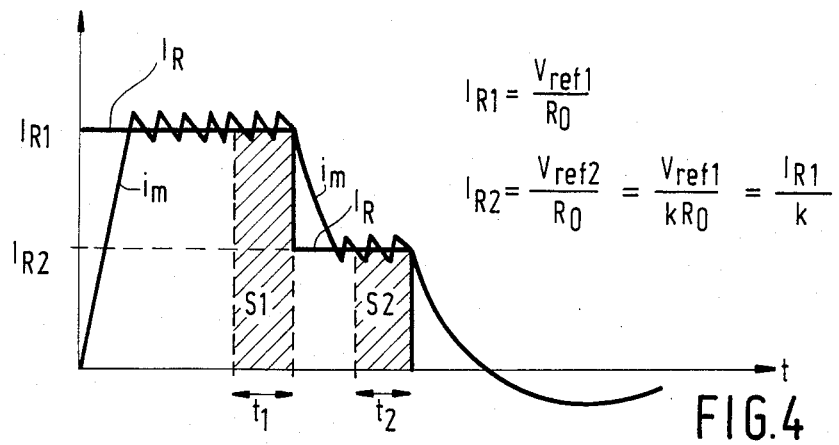
Figure 3A:
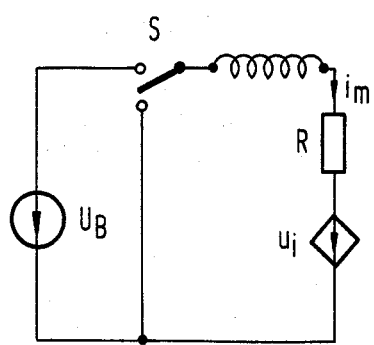
Figure 3B:
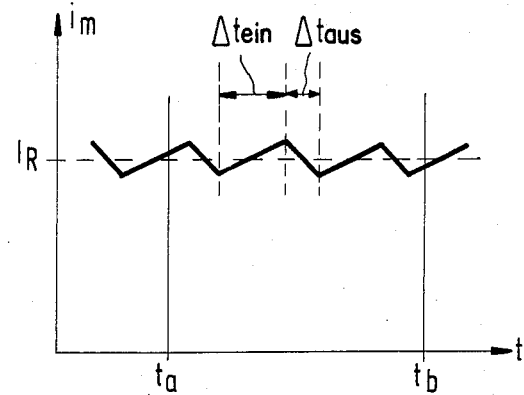
Figure 5:
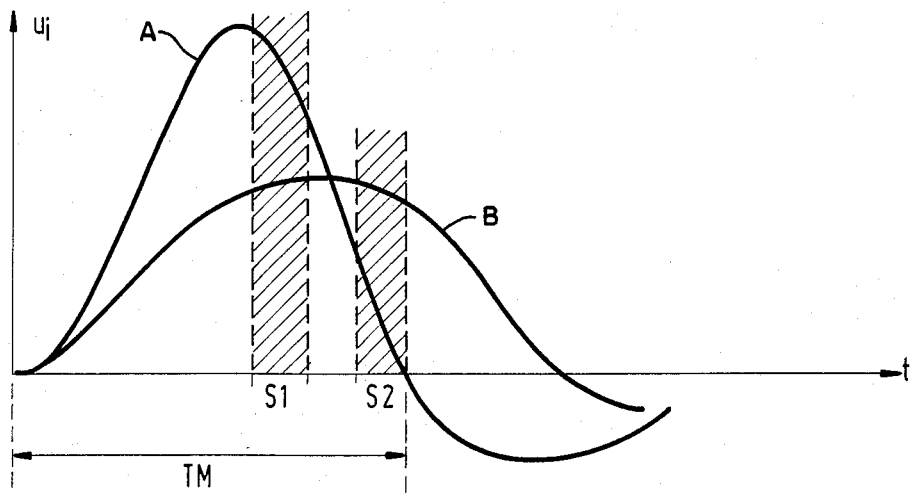
Figure 6:
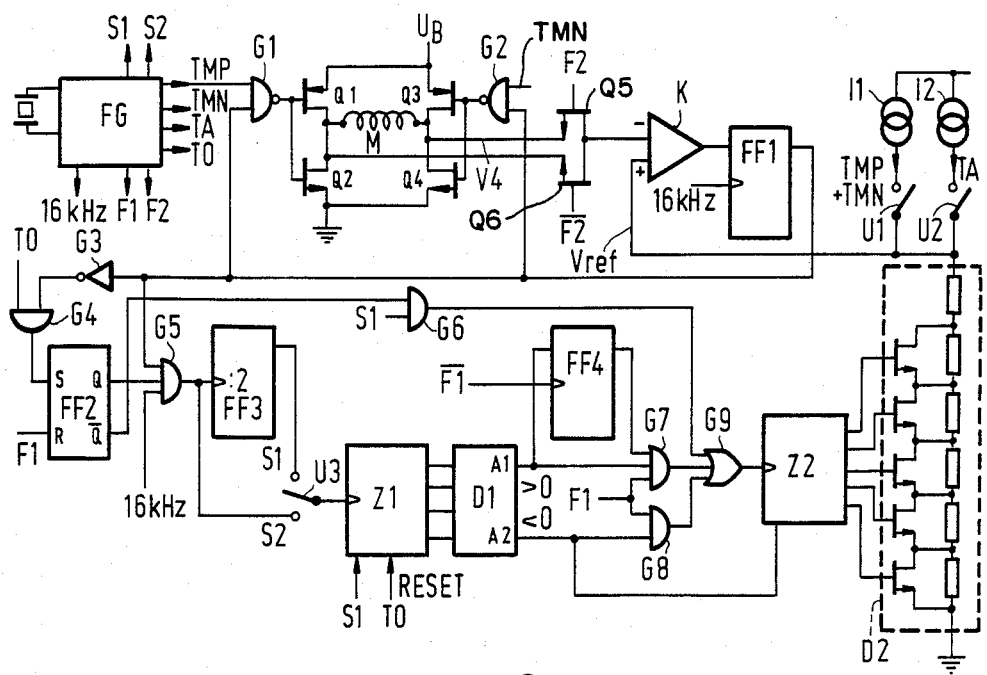
Figure 7:
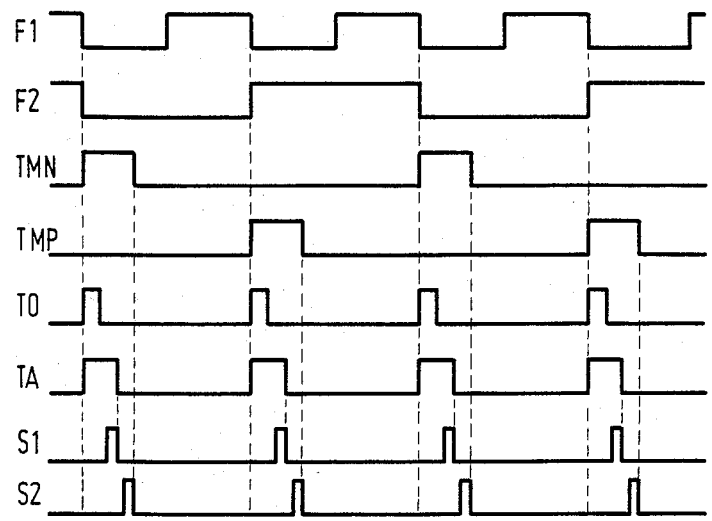

FIGS. 3a and 3b are respectively the equivalent diagram and an associated voltage diagram which illustrate the relationship between the induced voltage and the energizing pulse duration, FIG. 4 is a voltage diagram which illustrates the motor control and control criteria, FIG. 5 is a voltage diagram which illustrates the operating principle, FIG. 6 is a circuit diagram of a complete circuit arrangement for controlling the torque, and FIG. 7 shows waveform diagrams to illustrate the operating principle of the circuit arrangement shown in FIG. 6.

Figure 1:
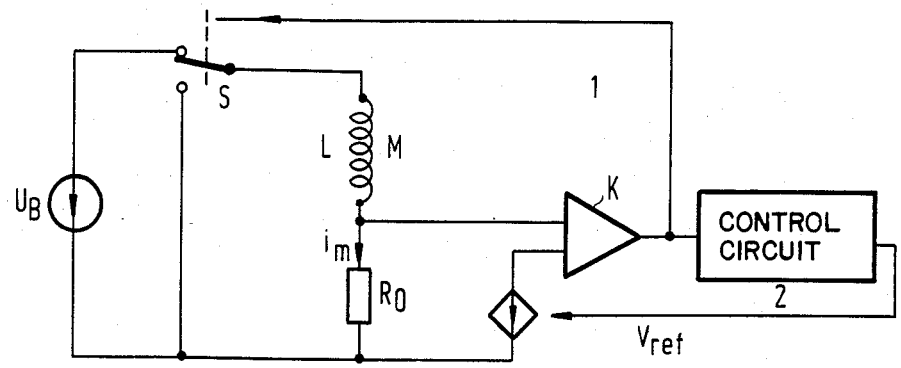
FIG. 1 is a circuit diagram which illustrates the principle of the invention.

FIG. 1 illustrates the principle of the method. The stepping motor M having an inductance L receives the battery voltage $U_B$ only temporarily during the energizing phase TM. If the motor current $i_m$ is smaller than the reference value $I_R = V_{ref}/R_o$, the motor is connected to the battery $U_B$ via the switch S and if the motor current $i_m$ is larger than $I_R$, the motor is short-circuited. As a result of the control circuit 1 the motor current always fluctuates about the value $I_R$, a sudden variation of the motor current $i_m$ being precluded by the inductance. A second control circuit 2 determines and adjusts the duration in which the switch S is in the energizing position so as to optimize the driving conditions.

Figure 2:
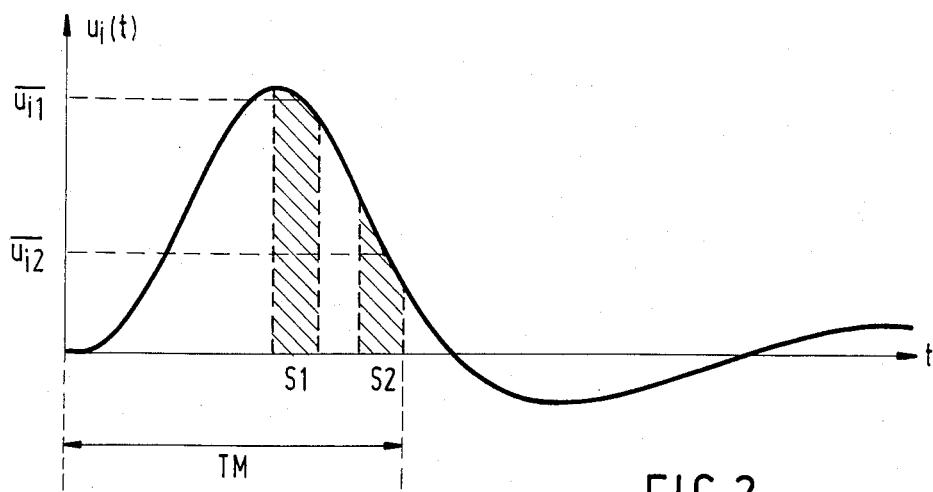
FIG. 2 is a voltage diagram for an energizing pulse.

The voltage $u_i(t)$ induced in the stator coil of the motor is a measure of the speed of rotation and the rotor position. If the variation of the induced voltage relative to the energizing pulse TM is substantially as shown in FIG. 2 a satisfactory motor efficiency will be obtained. By varying the reference voltage $V_{ref}$ the level of the motor current $i_m$ is controlled in such a way that the ratio of the average induced voltages ($\overline{u_{i1}}, \overline{u_{i2}}$) in two fixed predetermined measuring intervals (S1, S2) has a constant value k. For small motors an optimum drive is obtained if S1 occurs at the end of the acceleration phase and S2 at the end of the energizing pulse and if $k = \overline{u_{i1}}/\overline{u_{i2}} = 2$ The relationship between the induced voltage $u_i$ and the energizing time $t_{ein}$ may be derived from FIG. 4. If the motor which has an inductance L and a coil resistance R is connected to the battery which supplies the voltage $U_B$, the following is valid:

$$U_B \approx u_i + i_m R + L \frac{di_m}{dt}$$

$$U_B \approx u_i + I_R R + L \frac{\Delta i_m \, ein}{\Delta t_{ein}} \tag{1}$$

During short-circuit the following is valid:

$$0 = u_i + i_m R + L \frac{di_m}{dt}$$

$$0 \approx u_i + I_R R + L \frac{\Delta i_m \, aus}{\Delta t_{aus}} \tag{2}$$

As a result of the presence of the control circuit 1:

$$\Delta i_{m \, ein} = -\Delta i_m \, aus \tag{3}$$

The relative energizing time $\epsilon$ can be derived from formulas (1), (2) and (3).

$$\epsilon = \frac{\Delta t_{ein}}{\Delta t_{ein} + \Delta t_{aus}} = \frac{u_i + I_R R}{U_B} \quad (4)$$

The total energizing time $t_{ein}$ during a measuring interval $S_1$, $S_2$ which starts at the instant $t_a$ and which terminates at the instant $t_b$ is obtained by integration of $$t_{ein} = \int_{t_a}^{t_b} \epsilon \, dt = \frac{I_R R}{U_B}(t_b - t_a) + \int_{t_a}^{t_b} \frac{u_i}{U_B} dt \quad (5)$$

$$t_{ein} = \frac{I_R R}{U_B}(t_b - t_a) + \frac{\overline{u_i}}{U_B}(t_b - t_a) = \frac{t_b - t_a}{U_B}(I_R R + \overline{u_i})$$

In order to reach the control target $u_{i1}/u_{i2} = k$ independently of the value of the coil resistance R, the reference voltage $V_{ref}$ is switched from the value $V_{ref1}$ to the value $V_{ref2} = V_{ref1}/k$ after the first measuring interval S1 in the manner shown in FIG. 4. These two values follow from the formulas:

$$V_{ref1} = R_o I_{R1}$$

and $$V_{ref2} = R_o I_{R2}.$$

During the two measuring intervals the relative energizing time is determined.

$$\epsilon_1 = \frac{t_{ein1}}{t_1} = \frac{I_{R1} R + \overline{u_{i1}}}{U_B}$$

$$\epsilon_2 = \frac{t_{ein2}}{t_2} = \frac{I_{R2} R + \overline{u_{i2}}}{U_B} = \frac{\frac{I_{R1}}{k} R + \overline{u_{i2}}}{U_B}$$

From $\epsilon_1$ and $\epsilon_2$ the control quantity $\epsilon_r$ is derived, which no longer contains the unknown value R:

$$\epsilon_r = \epsilon_1 - k\epsilon_2 = \frac{\overline{u_{i1}} - k \overline{u_{i2}}}{U_B} \quad (6)$$

Now three situations may occur (FIG. 5):

$$\epsilon_r = 0: u_{i1} = k u_{i2} \text{ (see FIG. 2)}$$

The energization is as required. The reference voltage $V_{ref}$ is not changed.

$$\epsilon_r > 0: u_{i1} > k u_{i2} \text{ (See curve A, FIG. 5)}$$

The energization is too strong. The reference voltage $V_{ref}$ must be reduced for the next energizing pulse.

$$\epsilon_r < 0: u_{i1} < k u_{i2} \text{ (See curve B, FIG. 5)}$$

The energization is too weak and so $V_{ref}$ must be increased for the next energizing pulse.

Instead of the relative energizing times $\epsilon_1$ and $\epsilon_2$ the energizing times $t_{ein1}$ and $t_{ein2}$ may be used directly as the control criterion. If $t_1 = t_2$, the difference $t_{ein1} - k \cdot t_{ein2}$ must be controlled to become zero, whereas in the case of $t_2 = k \cdot t_1$ the value $t_{ein1} - t_{ein2}$ must be made zero.

In order to ensure that the reference current $I_R$ comes within the control range under extreme conditions as in the case of shocks of starting when the battery voltage is applied, $I_R$ is limited to a maximum value. If at the beginning of the motor pulse the motor is switched on for a time longer than a specified time $t_o$, $I_R$ is reduced automatically until the maximum energizing time is $t_o$. It is not until this instant that controlling in response to the induction voltage measured begins.

An example of a circuit for a bipolar stepping motor will now be described with reference to FIGS. 6 and 7. Via the bridge circuit comprising the transistors Q1, Q2, Q3, Q4 the stepping motor M is alternately energized with a positive and a negative current. The necessary frequencies and waveforms are supplied by the crystal-controlled frequency generator FG. During the positive motor step transistors Q1, Q4 and Q5 conduct and the transistors Q2, Q3 and Q6 are cut off. Via transistor Q4 transistor Q5 transfers the voltage drop V4, which is proportional to the motor current $i_m$, to the input of the comparator K, after which this voltage drop is compared with the reference voltage $V_{ref}$. When V4 becomes greater than $V_{ref}$ the output of comparator K changes from logic 1 to logic 0. This value is loaded into the 1-bit shift register FF1, which is clocked by a frequency of 16-kHz, so that after the next 16 kHz clock pulse the energizing pulse is interrupted via gate G1. Transistor Q2 is now conductive so that the motor is short-circuited via transistors Q2 and Q4. As a result, the motor current $i_m$ decreases. When the voltage drop V4 becomes smaller than the reference voltage $V_{ref}$ the battery voltage $U_B$ is applied to the motor M via transistor Q1 after the next 16-kHz clock pulse.

The reference voltage $V_{ref}$ is determined by the impedance of the resistor network D2 and by the value of the currents from the two identical current sources I1 and I2. I1 is turned on during the entire energizing pulse (TMP,TMN) and I2 is turned on only in the acceleration phase TA. Thus, the reference voltage $V_{ref}$ decreases to half the value after the time interval TA up to the end of the energizing pulse.

The energizing time $t_{ein}$ during which the motor M is connected to the supply voltage $U_B$, when the output of FF1 is in the 1-state, is now determined in the lower part of the circuit shown in FIG. 6 for controlling the reference voltage $V_{ref}$. If the voltage V4 does not reach the value $V_{ref}$ until after the pulse duration TO, flip-flop FF2 will not receive a set signal because the gate G4 is blocked, so that the inverted output $\overline{Q}$ of flip-flop FF2 remains 1. Via gates G6 and G9 a counting pulse S1 is applied to the up/down counter Z2, which is in the count-down mode. The resistor network D2 is then set to a lower value by the counter Z2 and the reference voltage $V_{ref}$ is decremented by one step. This control process is repeated during each motor step until the energizing time at the beginning of the motor pulse is smaller than the duration of TO. If this situation is obtained, flip-flop FF2 receives a set pulse, gate G2 is blocked and gate G5 is enabled. The energizing time $t_{ein}$ is measured during the equal measuring intervals S1 and S2 by counting the 16-kHz pulses as long as the output of flipflop FF1 is in the 1-state. During measuring interval S1 the number of 16-kHz pulses is divided by two in flip-flop FF3 and via a switch U3 the pulses are transferred to the up/down counter Z1 which is in the count-up mode.

During measuring interval S2 counter Z1 is in the count-down mode and the 16-kHz pulses are transferred directly to counter Z1. After the measuring interval S2 has elapsed the contents of counter Z1 is proportional to the motor-energizing time in measuring interval S1 minus two times the motor-energizing time in measuring interval S2. If the contents of counter Z1 is zero no signal will appear on the output of the resistor network D1 and the contents of counter Z2 is not changed. If the contents is smaller than zero, output A2 becomes a 1, which is added to the contents of counter Z2 via gates G8 and G9, so that the reference voltage $V_{ref}$ is incremented by one step. If the contents of counter Z1 is greater than zero, output A1 of the resistor network D1 becomes 1. This value is loaded into the 1-bit shift register FF4, in which it is stored until the next motor pulse appears. Gate G7 ensures that the contents of the counter Z2 is not decremented by 1 and consequently the reference voltage is not reduced until A1 has been 1 during two consecutive motor pulses. This ensures that the reference current is always determined by the weaker of the two drive directions in the case of an asymmetrical stepping motor.

Thus, this control process controls the reference voltage $V_{ref}$ in such a way that the motor energizing time during measuring interval S1 is twice as long as during the equal measuring interval S2, i.e. in such a way that the induction voltage during S1 is twice as high as during S2. The reference voltage $V_{ref}$ is adjusted in steps. The reference voltage $V_{ref}$ cannot be changed by more than one step per energizing pulse.

What is claimed is:

1. A method of controlling the torque of a stepping motor which comprises: energizing the motor with electric pulses of variable duration, controlling the duration of the energizing pulses so that the motor current is measured and maintained approximately constant at a predetermined current level, and deriving information about the actual value of the motor current by determining the induced voltage during a plurality of measuring intervals, from which information a reference value is derived for controlling the motor current.

2. A method as claimed in claim 1, characterized in that two measuring intervals are defined for each step of the motor.

3. A method as claimed in claim 2, characterized in that one measuring interval occurs at the end of an acceleration phase of an energizing pulse, and the other measuring interval occurs near the end of the energizing phase.

4. A method as claimed in claim 3, characterized in that the motor current is varied until the quotient of the average induced voltage in the first measuring interval and the average induced voltage in the second measuring interval assumes a specific constant value.

5. A method as claimed in claim 4, characterized in that for generating the quotient of the two average induced voltages the current in the second measuring interval is equal to the current in the first measuring interval divided by the constant value, the energizing time, during which the voltage source is connected, and which is related to the instantaneous length of the measuring interval, is measured as a relative energizing time, and the motor current is varied per stepping phase until the arithmetic difference of the relative energizing time in the first measuring interval minus the relative energizing time in the second measuring interval multiplied by the constant value becomes zero.

6. A circuit arrangement for controlling the torque of a stepping motor comprising: means for energizing the motor with pulses of variable duration, means for measuring the motor current, means for maintaining the motor current substantially constant around a reference level by controlling the duration of the energizing pulses, means for obtaining the value of the induced voltage during at least a first and a second measuring interval, and means for establishing different reference levels for the motor current during said measuring intervals.

7. A circuit arrangement as claimed in claim 6 wherein said means for obtaining the value of the induced voltage comprises at least one switching stage which connects the motor to the voltage source and the current is measured by means of the impedance of said switching stage to obtain the induced voltage.

8. A circuit arrangement as claimed in claim 6 wherein said means for measuring the motor current comprises a switching transistor, characterized in that the impedance of the switching transistor is employed for determining the current.

9. Apparatus for controlling the torque of a stepping motor comprising: a pair of input terminals for connection to a source of energizing voltage, a switching device for selectively connecting a stator coil of the motor to said input terminals in one switch condition and to provide a short-circuit of the stator coil in a second condition of the switching device, means including a comparator having one input coupled to the circuit of the stator coil for determining the induced voltage in said stator coil during first and second measuring intervals, a control circuit coupled to an output of said comparator for deriving first and second reference voltages during said first and second measuring intervals, means for supplying said first and second reference voltages to a second input of the comparator, and means for controlling the switching device to control the relative durations of the switching device in said first and second conditions so as to maintain the current in the stator coil approximately constant about a predetermined current level.

10. A method of controlling a stepping motor which comprises: energizing the motor with a sequence of electric pulses of variable duration for stepping the motor, establishing first and second measuring intervals during each energizing pulse, monitoring the motor current during said first and second measuring intervals to derive first and second different reference values in a given ratio, and controlling the duration of the energizing pulses to maintain the motor current approximately constant in response to information about the actual values of the motor current derived during said first and second measuring intervals.

11. Apparatus for controlling the drive to a stepping motor comprising: switching means for alternately connecting the stator winding of the motor to a source of voltage and for applying a short-circuit across said stator winding, a comparator having a first input coupled to a source of reference voltage that supplies first and second reference voltages in a given ratio to said first input during first and second time intervals established during each motor stepping pulse, means coupling a second input of the comparator to the stator winding and an output to circuit means for controlling the operation of said switching means such that if the motor current is less than a reference value determined by the reference voltage at the first input of the comparator the switching means connects the stator winding to said source of voltage and if the motor current is greater than said reference value the switching means applies said short-circuit across the stator winding, and circuit means controlled by the output of the comparator for adjusting the source of reference voltage as a function of comparison values obtained during said first and second time intervals.

12. Apparatus as claimed in claim 11 wherein said circuit means comprises an up/down counter and the source of reference voltage comprises: a resistor network, second switching means controlled by the output of said counter for selectively adjusting the resistance of the resistor network, first and second identical current sources, and first and second switches for selectively connecting said first and second current sources to said resistor network, and wherein the resistor network is coupled to the first input of the comparator to supply thereto said first and second reference voltages.

13. Apparatus as claimed in claim 11 further comprising means for deriving first and second electric pulses of equal duration occurring at the end of an acceleration phase of an energizing step pulse for the motor and near the end of said step pulse, respectively, thereby to establish said first and second time intervals.

14. Apparatus as claimed in claim 11 wherein said means for adjusting said reference voltage source includes an up/down counter for varying the values of reference voltage supplied to the first input of the comparator in a manner such that the motor current is varied until the ratio of the average induced voltage in the stator winding in the first time interval to the average induced voltage in the stator winding in the second time interval assumes said given ratio of the first and second reference voltages.

* * * * *